United States Patent
Lu et al.

(10) Patent No.: US 6,972,812 B2
(45) Date of Patent: Dec. 6, 2005

(54) LIQUID CRYSTAL DISPLAY

(75) Inventors: Rung Nan Lu, Tainan (TW); Yuan Liang Wu, Tainan (TW); Chun Hung Liou, Tainan (TW)

(73) Assignee: Chi Mei Optoelectronics Corp., (TW)

( * ) Notice: Subject to any disclaimer, the term of this patent is extended or adjusted under 35 U.S.C. 154(b) by 215 days.

(21) Appl. No.: 10/173,782

(22) Filed: Jun. 19, 2002

(65) Prior Publication Data

US 2003/0128312 A1     Jul. 10, 2003

(30) Foreign Application Priority Data

Jan. 8, 2002     (TW) ............................... 91100333 A

(51) Int. Cl.$^7$ ................... G02F 1/1368; G02F 1/1343; G02F 1/139
(52) U.S. Cl. ..................... 349/43; 349/110; 349/143; 349/146; 349/178
(58) Field of Search ................ 349/139, 143, 349/110, 128, 111, 106, 178, 43, 130, 160, 349/146

(56) References Cited

U.S. PATENT DOCUMENTS

| | | | |
|---|---|---|---|
| 6,567,144 B1 * | 5/2003 | Kim et al. .................. | 349/128 |
| 6,678,031 B2 * | 1/2004 | Song .......................... | 349/155 |
| 2002/0001058 A1 * | 1/2002 | Wang ......................... | 349/129 |

FOREIGN PATENT DOCUMENTS

JP        2001-83517        3/2001

OTHER PUBLICATIONS

Partial translation of JP 2001-83517—3 pages—Mar. 2001.*

* cited by examiner

Primary Examiner—Dung T. Nguyen
Assistant Examiner—Tai Duong

(57) ABSTRACT

A liquid crystal display mainly includes a first substrate and a second substrate processed for vertical alignment; a liquid crystal having a negative dielectric constant anisotropy and being sandwiched between the first and second substrates; an array of protrusions arranged in parallel to one another on the first substrate; and an array of slits provided on the pixel electrodes. The second substrate is provided with a plurality of gate lines, a plurality of data lines and a plurality of pixel electrodes. The pixel electrodes have first edges parallel to the gate lines and second edges parallel to the data lines. The protrusions have branches formed at positions facing the second edges of the pixel electrode in a manner that the angle included between the branches of the protrusions and the slits is kept at most 45 degrees.

13 Claims, 7 Drawing Sheets

LIQUID CRYSTAL DISPLAY

BACKGROUND OF THE INVENTION

1. Field of the Invention

The present invention generally relates to a liquid crystal display (LCD), and more particularly to a vertically-aligned (VA) LCD wherein the liquid crystal molecules inside the pixels are oriented to form a plurality of mutually different directions.

2. Description of the Related Art

Liquid crystal display device mainly comprises a liquid crystal display unit having two glass substrates oppositely positioned and a liquid crystal layer interposed therebetween. Vertically-aligned (VA) LCD is a mode using a negative liquid crystal material and vertical alignment films. When no voltage is applied, liquid crystal molecules are aligned in a vertical direction and a black display appears. When a predetermined voltage is applied, the liquid crystal molecules are aligned in a horizontal direction and a white display appears. Compared to the twisted nematic (TN) LCD, the vertically-aligned (VA) LCD provides higher contrast, higher response speed, and excellent viewing angle.

However, the VA LCDs still suffer from the problems of decreased contrast ratio and gray scale inversion when viewed in a direction not perpendicular to the display area. As a result of the interaction between light and the liquid crystal molecules, light passing through the cell interact with the molecules in a different way with respect to the incident angle into the cell. The contrast ratio between a light transmissive state (white) and a non-transmissive state (black) decreases drastically at an angle not perpendicular to the display, thereby making it less desirable in many applications, such as flat panel television screens and large computer screens.

The present invention therefore seeks to provide a VA LCD that overcomes or at least reduces the above-mentioned problems of the prior art.

SUMMARY OF THE INVENTION

It is an object of the invention to provide a vertically-aligned (VA) LCD having high contrast over a wide viewing angle.

In a general aspect of the present invention, a LCD mainly comprises a first substrate and a second substrate processed for vertical alignment; a liquid crystal having a negative dielectric constant anisotropy and being sandwiched between the first and second substrates; a light-shielding matrix formed on the first substrate; an array of protrusions arranged in parallel to one another on the first substrate; and an array of slits provided on the pixel electrodes. The slits and the main bodies of the protrusions are arranged alternately. Each protrusion has a main body being bent in zigzag and a plurality of branches. The second substrate has a plurality of gate lines formed parallel to one another; a plurality of data lines formed parallel to one another vertically to the gate lines; a plurality of pixel electrodes being arranged to form a matrix on the cross portion of the gate lines and the data lines. The pixel electrodes have first edges parallel to the gate lines and second edges parallel to the data lines. The light-shielding matrix has a plurality of columns extending along the data lines and a plurality of rows extending along the gate lines. According to the present invention, the viewing angle performance of the VA LCD can be improved by setting the orientation of the liquid crystal molecules inside pixels to a plurality of mutually different directions.

According to one embodiment of the present invention, by arranging all the branches of the protrusions at positions facing the second edges of the pixel electrodes in a manner that the angle included between the branches of the protrusions and the slits is kept at most 45 degrees, the difference between the directors (i.e., the average direction of the long axes of the LC molecules) of the LC molecules around the branches and slits is significantly reduced down to at most 45 degrees. This significantly suppresses disclination occurring at the border between the slits and the second pixel electrode edges, thereby avoiding display defects due to the disclination.

According to another embodiment of the present invention, each column of the light-shielding matrixes has a plurality of bulged portions formed in each pixel region. In this embodiment, the areas on the first substrate facing the second edges of the pixel electrodes between the main bodies of the protrusions and the slits are provided with the bulged portions and the branches of the protrusions, thereby significantly masking the darkening area due to crosstalk.

According to still another embodiment, the second edges of the pixel electrodes have a plurality of recesses formed outside the branches of the protrusions so as to relatively increase the minimum distance between the second edge of the pixel electrode and the data line at areas around the recesses, thereby significantly reducing the problem of crosstalk.

According to a further embodiment, the second edges of the pixel electrodes have a plurality of recesses arranged in a sawtooth pattern and each formed at a location outside the branches of the protrusions, thereby significantly reducing the effect of crosstalk.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 1:
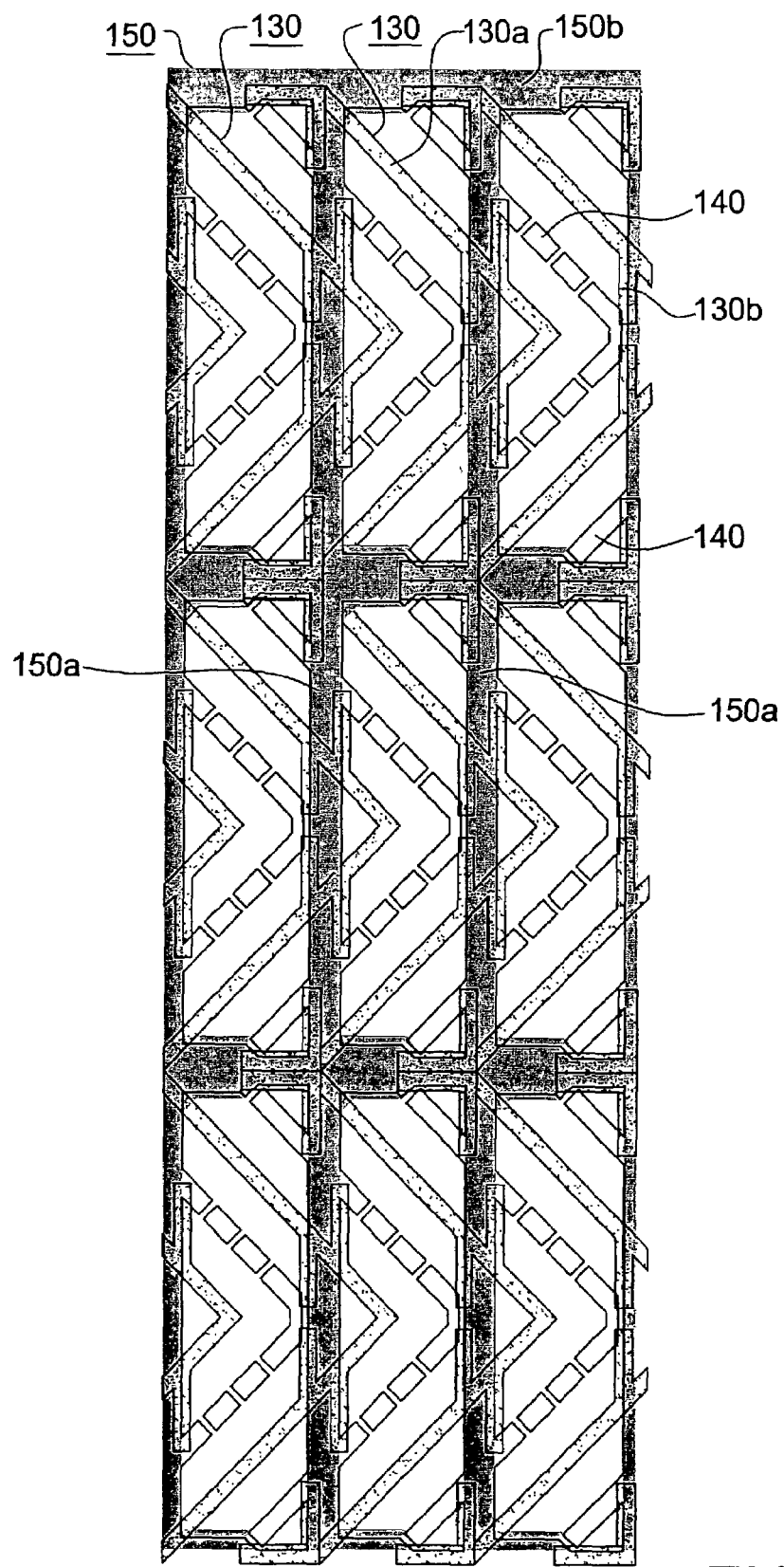
FIG. 1 is a plan view of pixel regions of a vertically-aligned (VA) LCD showing specific protrusions and slits pattern according to a first embodiment of the present invention.
Figure 2:
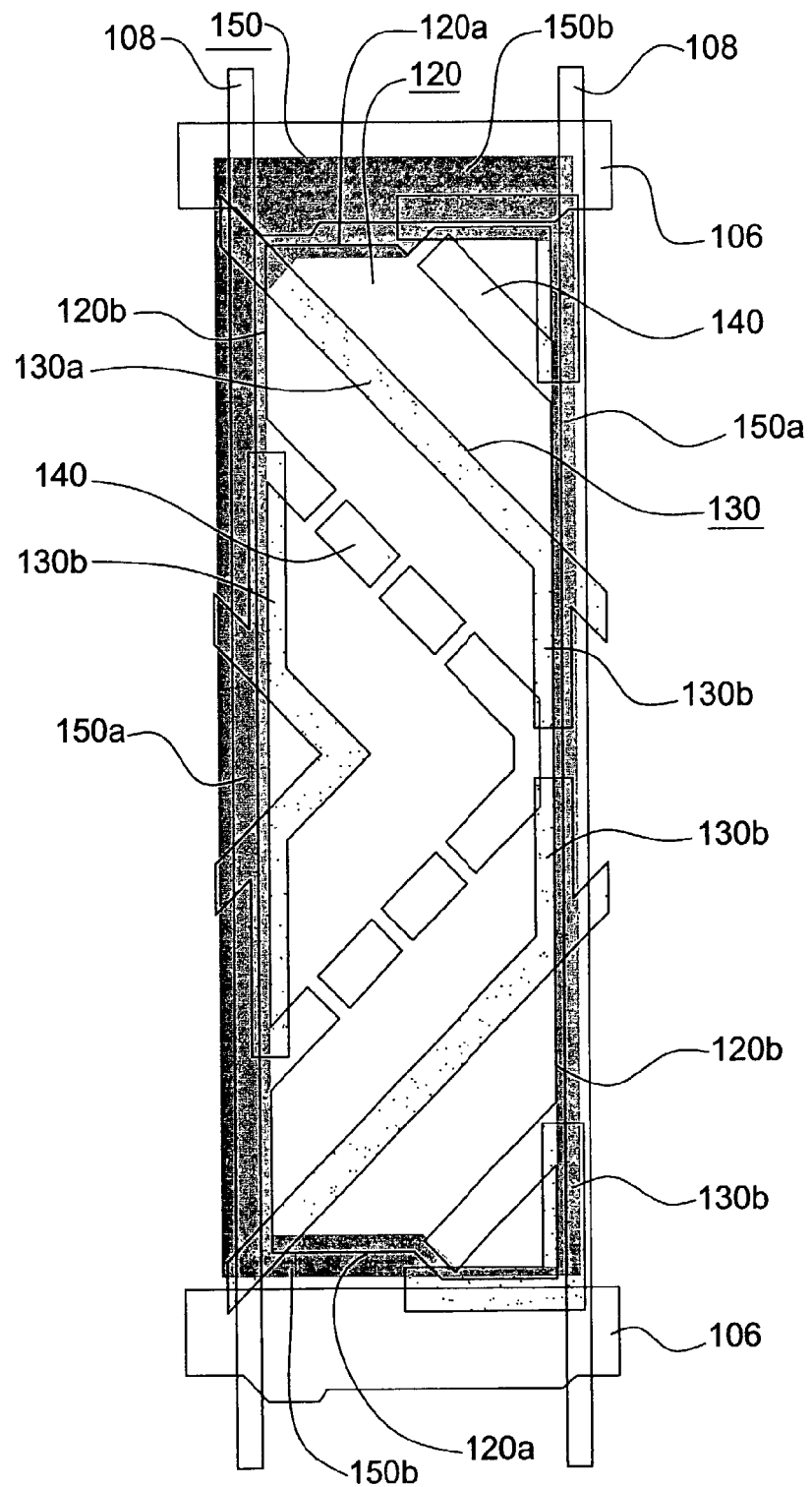
FIG. 2 is a plan view of a single pixel region of the vertically-aligned (VA) LCD according to the first embodiment of the present invention.
Figure 7:
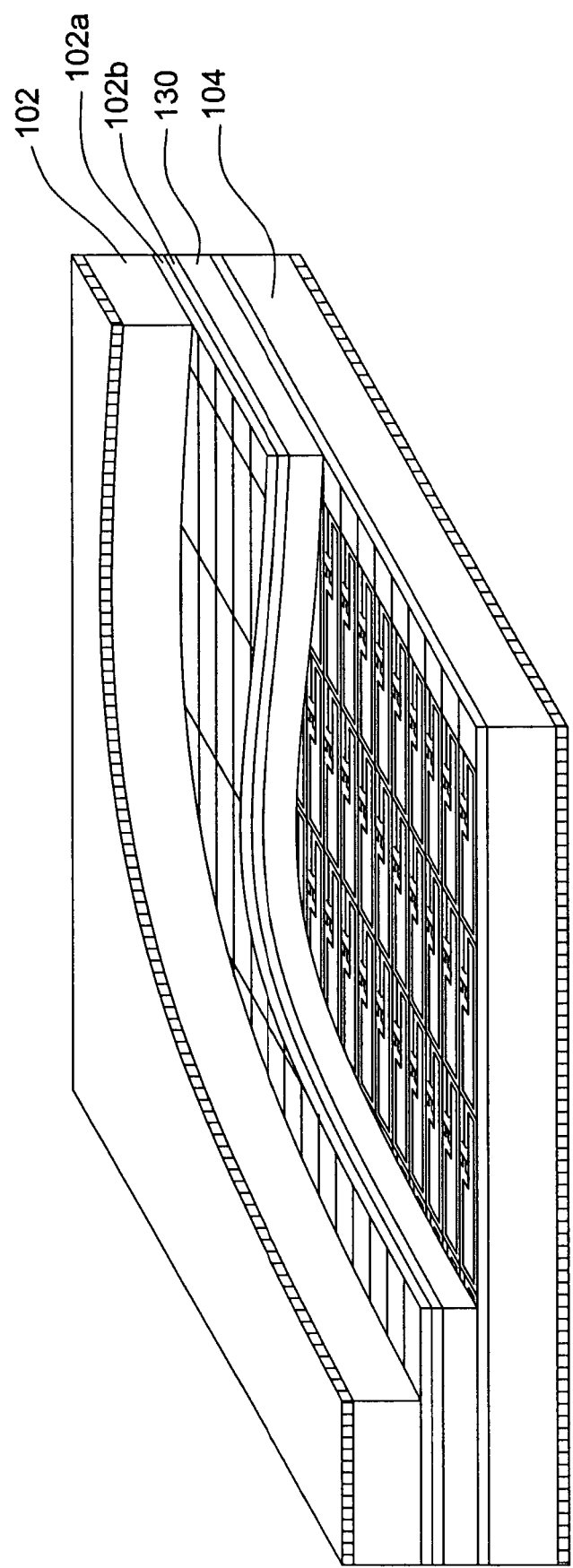
FIG. 7 is a partial cutaway view of a vertically-aligned (VA) LCD according to one embodiment of the present invention.

FIGS. 1 and 2 show the pixel region(s) of a vertically-aligned (VA) liquid crystal display device (LCD) with specific protrusion and slit pattern according to one embodiment of the present invention. According to the present invention, the LCD mainly comprises a first substrate and a second substrate. The surfaces of the substrates are processed for vertical alignment. A liquid crystal having a negative dielectric constant anisotropy is sealed between the two substrates. The VA LCD of the present invention is preferably a thin-film transistor LCD. As shown in FIG. 7, the first substrate 102 has a light-shielding matrix, for example a black matrix (not shown), formed thereon; a plurality of color filters 102a and a common electrode 102b. As shown in FIG. 2, the second substrate 104 is provided with a plurality of parallel gate lines 106, a plurality of parallel data lines 108 perpendicular to the gate lines 106, and a plurality of thin film transistors (TFTs) and pixel electrodes 120 formed like a matrix at the intersections between the gate lines and data lines. Typically, the first substrate 102 is referred to as a color filter (CF) substrate because color filters are formed, while the second substrate 104 is referred to as a TFT substrate. Usually, spacers (not shown) are formed between the substrates for defining the gap between the substrates.

Referring to FIGS. 1 and 2, the pixel electrode 120 is defined by two adjacent gate lines 106 and data lines 108 (not show in FIG. 1). The pixel electrode 120 has first edges 120a parallel to the gate lines and second edges 120b parallel to the data lines. According to the present invention, the LCD is formed with a plurality of protrusions 130 and slits 140 for regulating the orientation of the liquid crystal such that the alignment of liquid crystal molecules is induced by application of a voltage to include a plurality of directions. According to the present invention, by virtue of orientating the liquid crystal molecules into a plurality of mutually different directions, the viewing angle the VA LCD can be greatly improved. The protrusions 130 are arranged in parallel to one another on the first substrate. Each protrusion 130 has a main body 130a being bent in zigzag. The slits 140 are provided on the pixel electrodes 120. It is noted that the pixel electrodes 120 are divided into several portions by the slits 140. As shown in FIG. 1, the slits 140 and the main bodies 130a of the protrusions are arranged alternately.

Generally speaking, when the liquid crystal display is only provided with the slits 140 and the main bodies 130a of the protrusions bent in zigzag, some particular area within the pixel appear darkened. It is found that the change of the orientation of the liquid crystal in the darkening area turns to become slow in response to the voltage applied. This reduces the contrast and the response speed, thereby deteriorating the display quality. This is due to the fact that the inclination of liquid crystal molecules influenced by the electric field near the edge 120b of the pixel electrode is considerably different from that caused by the slits 140. This results in a disclination at the border between the domain formed by the edge 120b of the pixel electrode and the domain formed by the slits 140. Therefore, a darkening area is shown in the vicinity of the boundary between the slits 140 and the edges 120b of the pixel electrode.

The LCD constructed according to the present invention is characterized in that each protrusion 130 has a plurality of branches 130b formed at the positions facing the second edges 120b of the pixel electrode. It is noted that the angle included between the branches 130b of the protrusions and the slits 140 is kept smaller than or equal to 45 degrees such that the difference between the directors (i.e., the average direction of the long axes of the LC molecules) of the LC molecules near the boundary between the branches 130b and the slits 140 is significantly reduced to at most 45 degrees. This efficiently suppresses the disclination occurring at the border between the slits 140 and the edges 120b of the pixel electrode.

As shown in FIGS. 1 and 2, the light-shielding matrix 150 is hatched to facilitate understanding. Generally speaking, the light-shielding matrix has a plurality of columns 150a extending along the data lines 108 and a plurality of rows 150b extending along the gate lines 106. As shown in FIGS. 1 and 2, each column 150a of the light shielding matrix has a substantially uniform width. To obtain a better aperture ratio (i.e. light transmittance ratio), the pixel electrode edges 120b are preferably designed to be close to the data lines 108. However, when the edges 120b of the pixel electrode are arranged too close to the data lines 108, it causes the problem of capacitive coupling (i.e. crosstalk), which, in turn, leads to the phenomenon of partial darkening in the display area.

Figure 3:
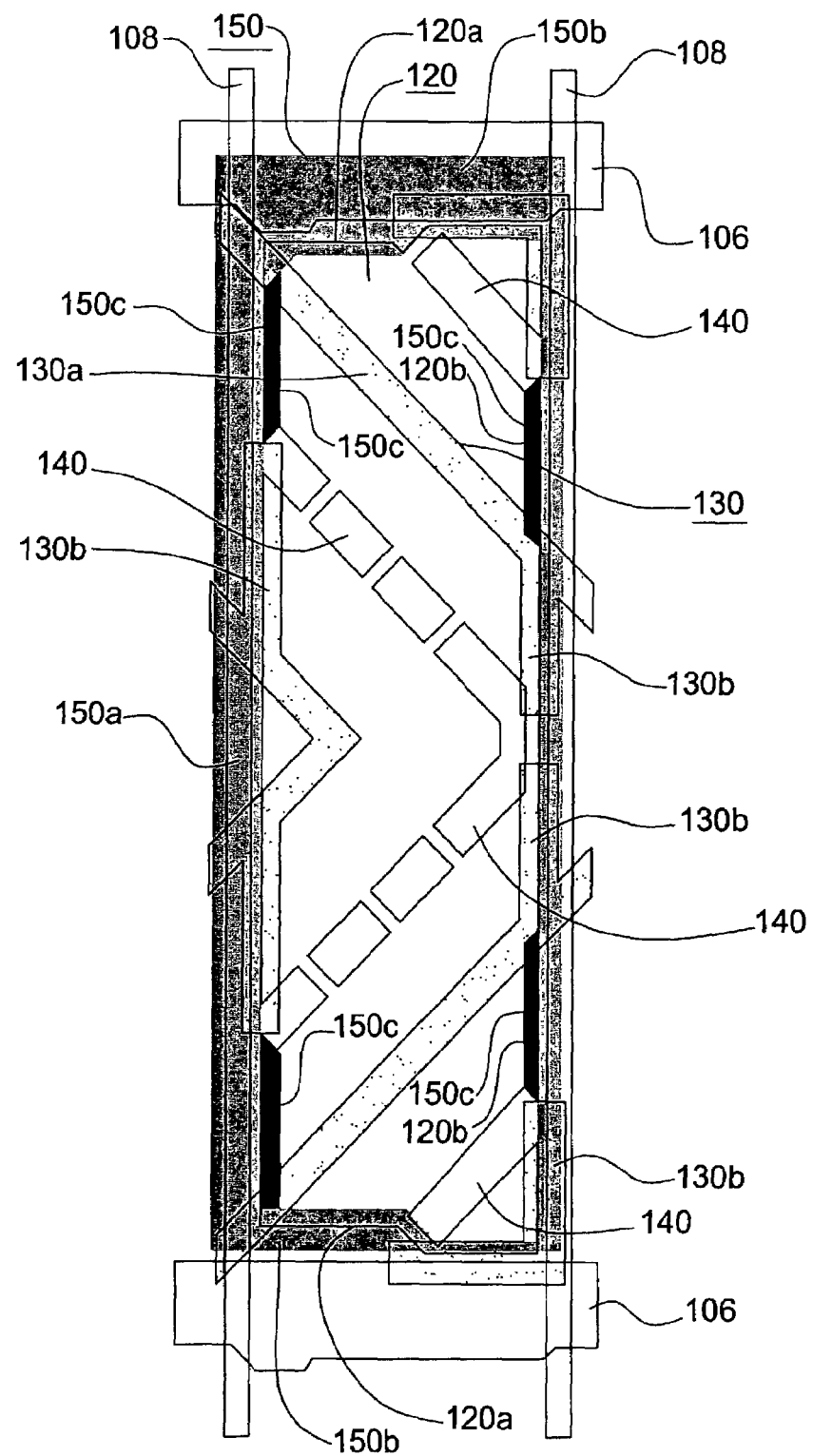
FIG. 3 is a plan view of a single pixel region of a vertically-aligned (VA) LCD according to a second embodiment of the present invention.

FIG. 3 shows the pixel region of a vertically-aligned LCD according to a second embodiment of the present invention. This LCD is characterized in that each column 150a of the light-shielding matrix has a plurality of bulged portions (only four bulged portions 150c denoted in FIG. 3) disposed in each pixel region. In this embodiment, areas on the first substrate facing the second edges of the pixel electrodes between the main bodies 130a of the protrusions and the slits 140 are all covered by the bulged portions 150c and the branches 130b of the protrusions, thereby significantly blocking the darkening area caused by crosstalk. It is noted that the branches 130b are not an essential part of the present invention. Alternatively, the bulged portions of each column 150a of the light-shielding matrix may be designed to substitute for the branches 130b.

Figure 4:
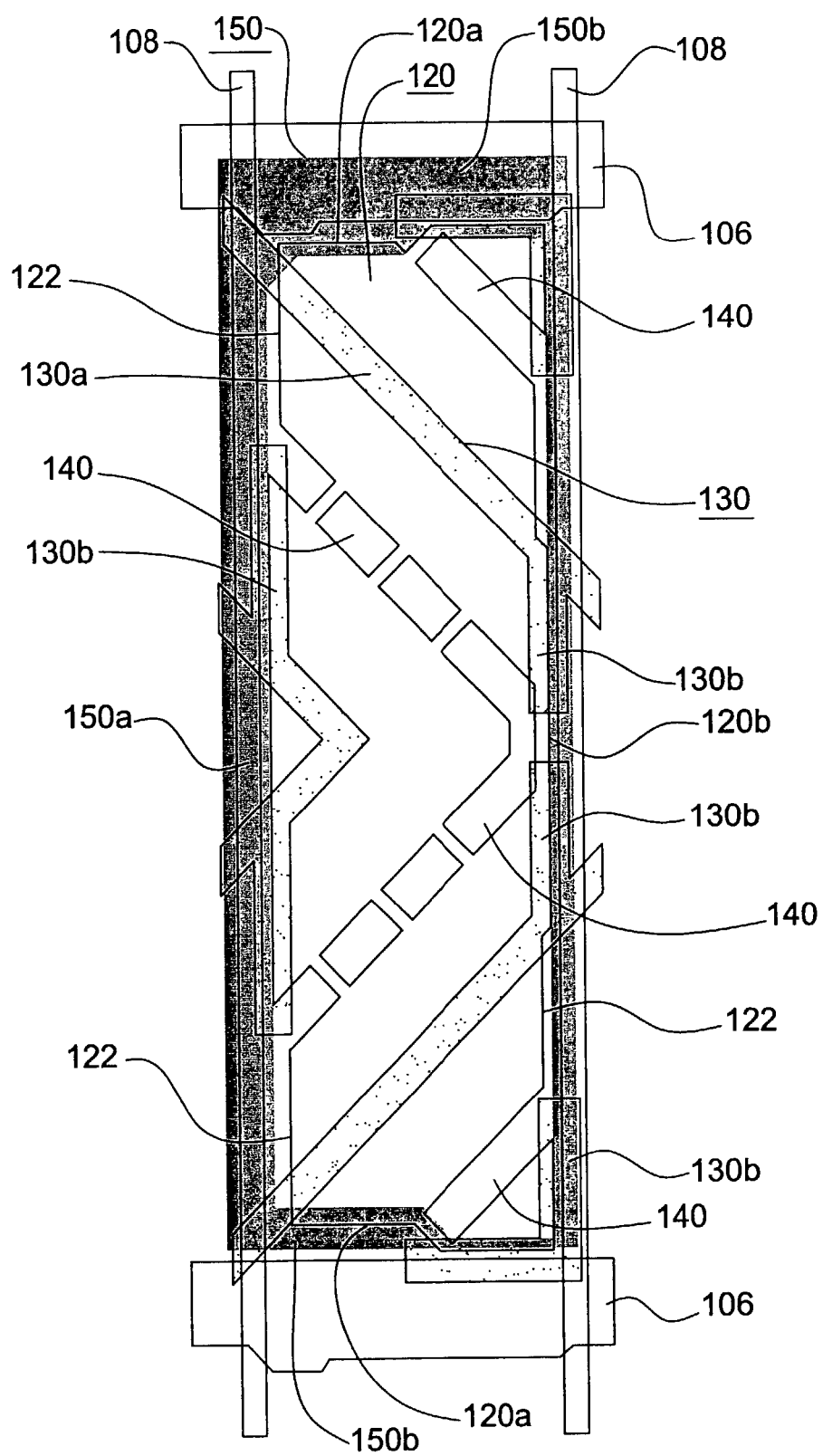
FIG. 4 is a plan view of a single pixel region of a vertically-aligned (VA) LCD according to a third embodiment of the present invention.

FIG. 4 shows the pixel region of a vertically-aligned LCD according to a third embodiment of the present invention. The LCD is characterized in that the second edges 120b of the pixel electrodes 120 have a plurality of recesses 122 formed outside the branches 130b of the protrusions so as to relatively increase the minimum distance between the second edge 120b of the pixel electrode and the data line, thereby significantly reducing the problem of crosstalk.

Figure 5:
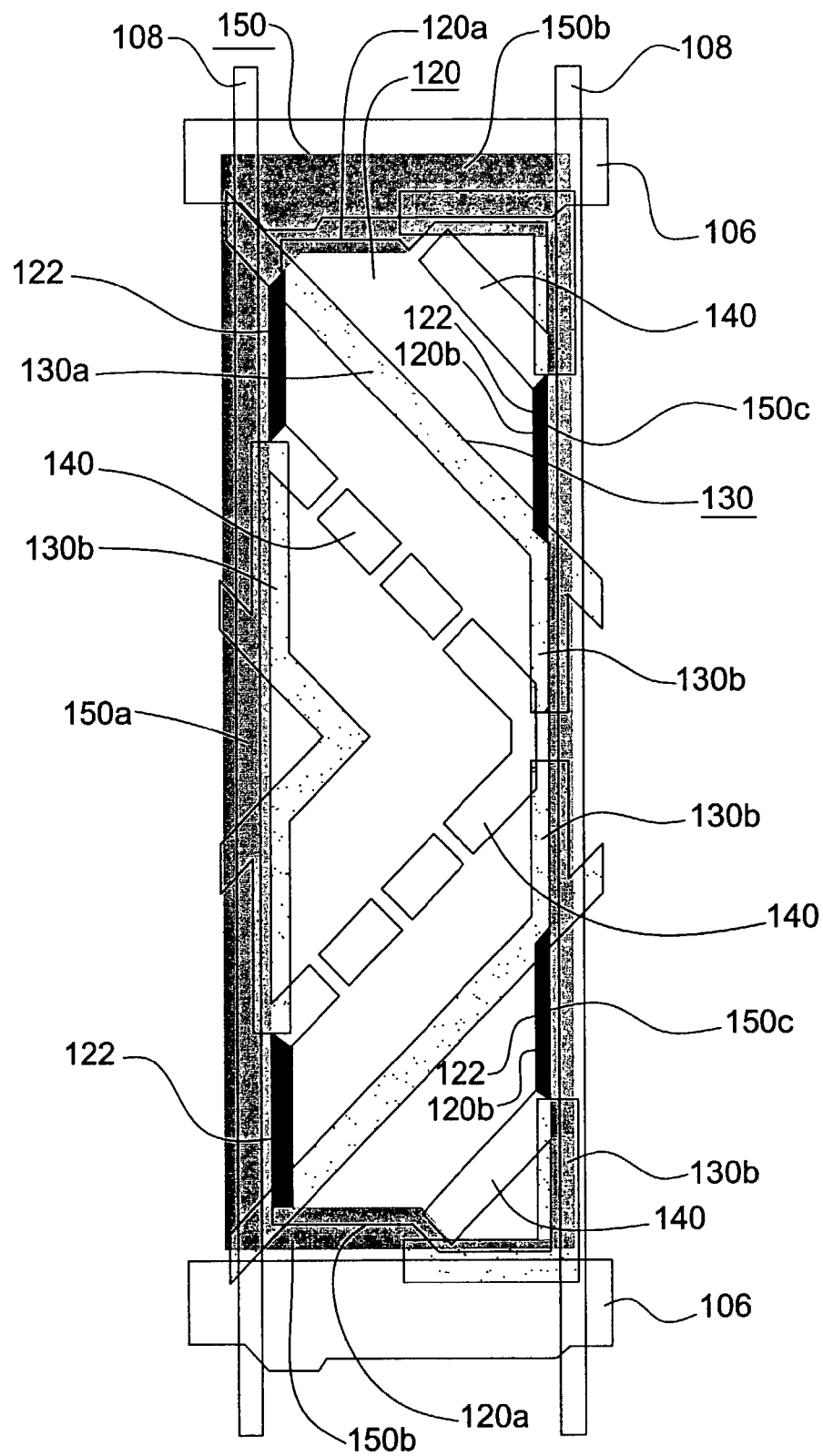
FIG. 5 is a plan view of a single pixel region of a vertically-aligned (VA) LCD according to a fourth embodiment of the present invention.

FIG. 5 shows the pixel region of a vertically-aligned LCD according to a fourth embodiment of the present invention. The LCD is characterized by provided with both the bulged portions 150c and the recesses 122, thereby reducing the aforementioned problems.

Figure 6:
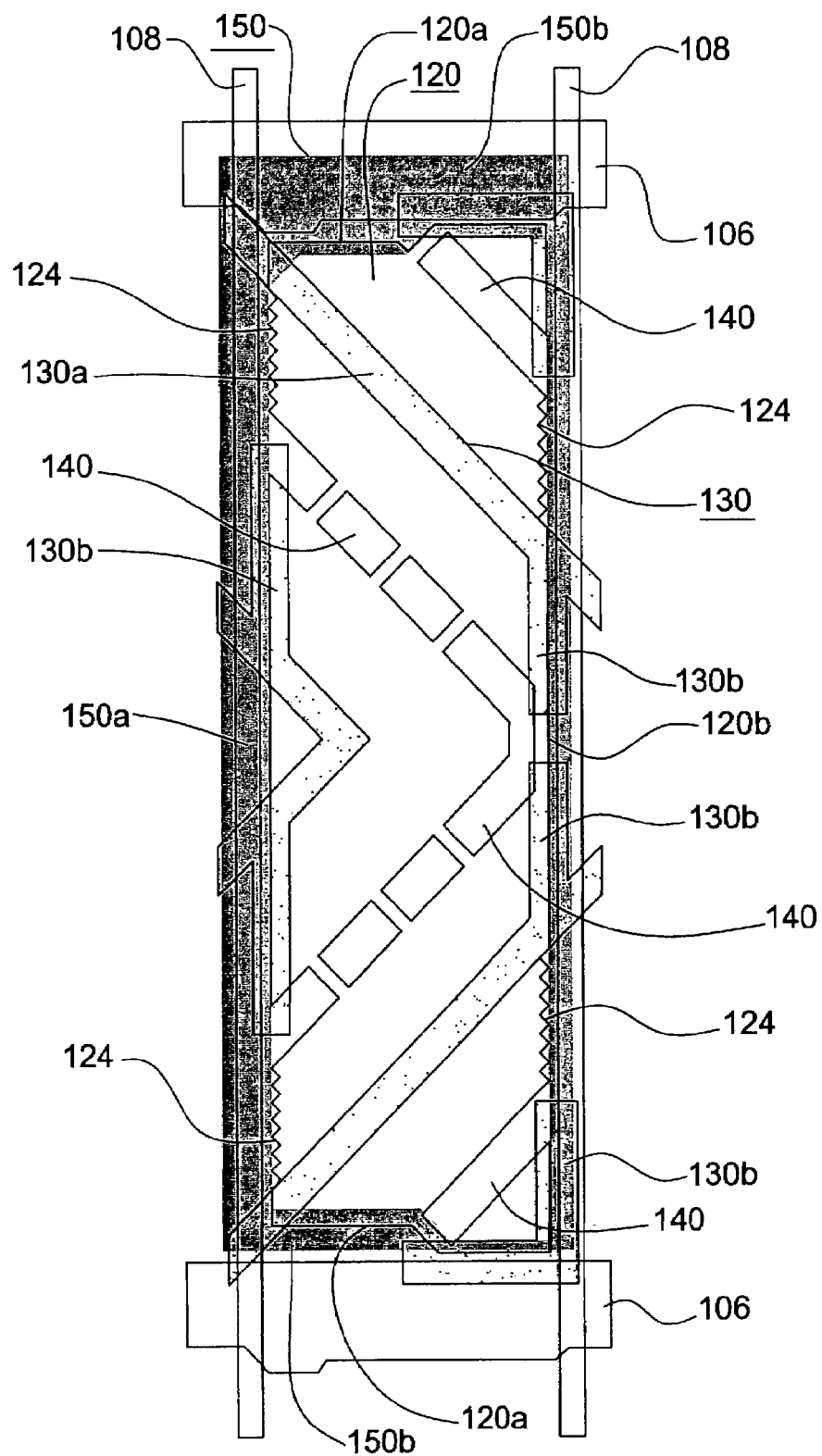
FIG. 6 is a plan view of a single pixel region of a vertically-aligned (VA) LCD according to a fifth embodiment of the present invention.

FIG. 6 shows the pixel region of a vertically-aligned LCD according to a fifth embodiment of the present invention. The LCD is characterized in that the second edges 120b of the pixel electrodes have a plurality of recesses 124 arranged in a sawtooth pattern formed outside the branches 130b of the protrusions, thereby significantly reducing the effect of crosstalk.

Next, the process for forming the protrusions will be described as follows. When the protrusions 130 are formed on the CF substrate, a photoresist is coated on the surfaces thereof, transferred a predetermined pattern (referring to the pattern shown in FIGS. 1–6), and then developed to form the protrusions 130. This process is easily carried out by using conventional techniques. Additionally, the slits 140 can be formed simultaneously with the pixel electrodes 120 by utilizing conventional process.

Although the invention has been explained in relation to its preferred embodiment, it is to be understood that many other possible modifications and variations can be made without departing from the spirit and scope of the invention as hereinafter claimed.

What is claimed is:

1. A liquid crystal display, comprising:
    a first substrate and a second substrate processed for vertical alignment;
    a liquid crystal material having a negative dielectric constant anisotropy and being sandwiched between the first and second substrates;
    a light-shielding matrix formed on the first substrate;
    a plurality of parallel gate lines formed on the second substrate;
    a plurality of parallel data lines perpendicular to the gate lines, wherein the gate lines and the data lines are arranged to form a matrix of pixel regions with each of the pixel regions defined by two adjacent gate lines and two adjacent data lines;
    a pixel electrode in each of the pixel regions, the pixel electrode having first edges parallel to the gate lines and second edges parallel to the data lines;
    an array of protrusions each having a main body and a plurality of branches on the first substrate, the main bodies of the protrusions having zigzag patterns arranged in parallel to one another; and
    an array of slits provided on the pixel electrodes, the slits and the main bodies of the protrusions being arranged alternately;
    wherein all of the branches of the protrusions are formed at positions facing the second edges of the pixel electrodes in a manner that the angle between the branches of the protrusions and the slits is at most 45 degrees; and
    wherein the second edges of the pixel electrodes have a plurality of recesses arranged in a sawtooth pattern and formed outside the branches of the protrusions.

2. The liquid crystal display as claimed in claim 1, wherein the light-shielding matrix has a plurality of columns extending along the data lines and a plurality of rows extending along the gate lines, each column of the light-shielding matrix having a plurality of bulged portions.

3. The liquid crystal display as claimed in claim 2, wherein the areas on the first substrate facing the second edges of the pixel electrodes between the main bodies of the protrusions and the slits are substantially covered by the bulged portions of each column of the light-shielding matrix and the branches of the protrusions.

4. A thin film transistor substrate for use in forming a liquid crystal display with a color filter substrate, the color filter substrate having an array of protrusions formed thereon and each of the protrusions having a main body and a plurality of branches, the thin film transistor substrate comprising:
    a plurality of parallel gate lines;
    a plurality of parallel data lines perpendicular to the gate lines, wherein the gate lines and the data lines are arranged to form a matrix of pixel regions with each of the pixel regions defined by two adjacent gate lines and two adjacent data lines; and
    a pixel electrode in each of the pixel regions, the pixel electrode having first edges parallel to the gate lines and second edges parallel to the data lines;
    wherein the second edges of the pixel electrodes have a plurality of recesses arranged in a sawtooth pattern and formed outside the branches of the protrusions.

5. The thin film transistor substrate as claimed in claim 4, wherein the main bodies of the protrusions have zigzag patterns arranged in parallel to one another.

6. The thin film transistor substrate as claimed in claim 4, further comprising:
    an array of slits provided on the pixel electrodes, wherein the slits and the main bodies of the protrusions are arranged alternately.

7. The thin film transistor substrate as claimed in claim 6, wherein all of the branches of the protrusions are formed at positions facing the second edges of the pixel electrode in a manner that the angle between the branch of the protrusion and the slit is at most 45 degrees.

8. A liquid crystal display, comprising:
    a first substrate and a second substrate;
    a liquid crystal material sandwiched between the first and second substrates;
    a light-shielding matrix formed on the first substrate;
    a plurality of parallel gate lines formed on the second substrate;
    a plurality of parallel data lines transverse to the gate lines, wherein the gate lines and the data lines form a matrix of pixel regions, each of the pixel regions being defined by two adjacent gate lines and two adjacent data lines;
    a pixel electrode in each of the pixel regions, the pixel electrode having first outer edges extending respectively along the two adjacent gate lines defining said pixel region, and second outer edges extending respectively along the two adjacent data lines defining said pixel region; and
    an array of protrusions on the first substrate;
    wherein each of the second edges of the pixel electrodes has at least a first region where at least one of said protrusions overlaps said second edge, and at least a second region where said second edge is not overlapped by any of the protrusions, wherein said second edge in the second region has a sawtooth pattern.

9. The liquid crystal display of claim 8, wherein the pixel electrodes have an array of slits, the slits and the protrusions being arranged alternately.

10. The liquid crystal display of claim 9, wherein each of the protrusions has a main body of a zigzag pattern and a number of branches each overlapping one second edge of one of the pixel electrodes.

11. A liquid crystal display, comprising:
    a first substrate and a second substrate;
    a liquid crystal material sandwiched between the first and second substrates;
    a plurality of parallel gate lines formed on the second substrate;
    a plurality of parallel data lines transverse to the gate lines, wherein the gate lines and the data lines form a matrix of pixel regions, each of the pixel regions being defined by two adjacent gate lines and two adjacent data lines;
    a pixel electrode in each of the pixel regions, the pixel electrode having first edges extending respectively along the two adjacent gate lines defining said pixel region, and second edges extending respectively along the two adjacent data lines defining said pixel region;
    an array of protrusions each having a main body and a plurality of branches on the first substrate;
    an array of slits provided on the pixel electrodes, the slits and the main bodies of the protrusions being arranged alternately; and a light-shielding matrix formed on the first substrate and having a plurality of columns extending along the data lines and a plurality of rows extending along the gate lines, each column of the light-shielding matrix having a plurality of bulged portions;

wherein the areas on the first substrate facing the second edges of the pixel electrodes between the main bodies of the protrusions and the slits are substantially covered by the bulged portions of each column of the light-shielding matrix and the branches of the protrusions.

12. The liquid crystal display as claimed in claim 11, wherein the main bodies of the protrusions have zigzag patterns arranged in parallel to one another.

13. The liquid crystal display as claimed in claim 11, wherein the second edges of the pixel electrodes have a plurality of recesses formed outside the branches of the protrusions.

* * * * *